United States Patent [19]

Nishino et al.

[11] Patent Number: 4,788,561
[45] Date of Patent: Nov. 29, 1988

[54] OPTICAL RECORDING CARRIER

[75] Inventors: Seiji Nishino, Osaka; Yuzo Takada, Hirakata, both of Japan

[73] Assignee: Matsushita Electric Industrial Co., Ltd., Osaka, Japan

[21] Appl. No.: 177,901

[22] Filed: Apr. 1, 1988

Related U.S. Application Data

[63] Continuation of Ser. No. 886,236, Jul. 16, 1986, abandoned.

[30] Foreign Application Priority Data

Jul. 19, 1985 [JP] Japan .................................. 60-160573

[51] Int. Cl.⁴ ............................................. G01D 15/34
[52] U.S. Cl. ..................................................... 346/135.1
[58] Field of Search .................. 346/135.1, 76 L, 137; 430/945, 346, 270; 369/288

[56] References Cited

U.S. PATENT DOCUMENTS

| | | | |
|---|---|---|---|
| 3,636,526 | 1/1972 | Feinleib | 346/135.1 X |
| 3,971,874 | 7/1976 | Ohta et al | 346/76 L X |
| 4,278,734 | 7/1981 | Ohta et al. | 346/76 L X |
| 4,357,366 | 11/1982 | Takaoka | 427/166 X |
| 4,434,429 | 2/1984 | Terao | 346/135.1 |
| 4,460,636 | 7/1984 | Watanabe | 346/135.1 X |
| 4,576,895 | 3/1986 | Barton | 430/945 X |
| 4,587,209 | 5/1986 | Ohno | 346/135.1 X |
| 4,682,321 | 7/1987 | Takaoka | 369/284 |

OTHER PUBLICATIONS

Patent Abstracts of Japan, vol. 5, No. 48, (P-55), [720], Apr. 7, 1981, & JP-A-56 3442 (Tokyo Shibaura Denki K.K.) 14-01-1981.

Patent Abstracts of Japan, vol. 7, No. 282 (P-243) [1427], Dec. 16, 1983; & JP-A-58 158 056 (Nippon Denshin Denwa Kosha).

Primary Examiner—Joseph W. Hartary
Attorney, Agent, or Firm—Stevens, Davis, Miller & Mosher

[57] ABSTRACT

The invention relates to an optical recording carrier wherein a recording laser beam or the like is focused onto a recording material so that information signals are recorded thereon. It is one aspect of this invention to provide an optical recording carrier wherein a single Te element crystal layer having a thickness of 50 to 300 Å is formed between a substrate and an optical recording layer containing Te or TeOx ($0 < X < 2$) as a main component and at least one selected from the group consisting of 0–20 at % Se, 0–15 at % C, 0–10 at % Sb, 0–5 at % Au, 0–5 at % Ag, 0–10 at % Pd, 0–5 at % As, 0–5 at % Ge, 0–5 at % S, 0–5 at % Si, and 0–3 at % Ni.

5 Claims, 3 Drawing Sheets

OPTICAL RECORDING CARRIER

This application is a continuation of application Ser. No. 886,236, filed July 16, 1986 now abandoned.

BACKGROUND OF THE INVENTION

1. Field of the Invention

The present invention relates to an optical recording carrier wherein a recording laser beam or the like is focused onto a recording material so that information signals can be recorded thereon, and to a method of producing such an optical recording carrier.

2. Description of Related Art

Nowadays, various studies are being conducted on the concept of an optical recording carrier wherein a laser beam is focused onto a recording material by a lens or the like, with the beam being varied in correspondence with information, so that information signals can be recorded on the recording material. In particular, the use of optical magnetic materials, Te-based materials and organic materials as recording materials has already been published. Of these, the Te-based recording materials are the nearest to being developed to a practical level, and some of them have already been put to practical use.

Te-based recording materials are classified into two groups. One group comprises Te-C, and Te-Se materials etc. as disclosed in U.S. Pat. No. 3,636,526, wherein a recording material is partially sublimated by the application of a laser beam thereon so a to form holes in the material, thereby recording signals. The other group comprises TeOx and Te-Sb-Se materials etc. as disclosed in U.S. Pat. Nos. 3,971,874 and 4,278,734, wherein signal recording is effected by utilizing the phenomenon that an amorphous-phase film made of the TeOx or Te-Sb-Se materials etc. is changed to a crystal-phase film by the heat of a laser beam.

However, these prior-art methods involves the following disadvantages.

In the former methods, featuring the thermal formation of recording holes, an air-gap system must be adopted to discharge the sublimated Te metal. This inevitably complicates the disc structure and makes the system difficult to assemble.

On the other hand, the latter method, employing a change from an amorphous phase to a crystal phase, has an advantage in that, since nothing is sublimated, the clad structure shown in FIG. 3 is enabled, and thus the disc structure can be simplified.

However, since the phase-change recording method, as mentioned previously, utilizes a change from an amorphous phase to a crystal phase of one of the recording materials such as TeOx, Te-Sb-Se and etc. some of which have already been practically used, there has existed such problem that a remarkable period of time is necessary till the recording material essentially reaches its final stable recorded condition (or stable crystal-phase condition). This problem is attributable to the fact that, when the recording material is changed from the amorphous phase to the crystal phase by the thermal energy of the laser beam, the crystallization progresses at a finite speed from crystal nuclei acting as seeds.

As an example, assume that, as shown in FIG. 4(a), an irradiation of laser beam 10 having a forcused diameter of about 1 $\mu$m is applied onto a Te-based amorphous recording film 3 through a lens 11 for a short time (approximately 1 $\mu$s). In this example, as shown in FIG. 4(b), only a region 12 is crystallized immediately after recording, but, for about two minutes after the recording, the crystallized region expands to another region 13. When a laser beam is used to record signals onto and immediately read them out of an optical recording carrier which includes a Te-based amorphous film deposited onto a disc-like substrate, while the carrier is rotating about its axis at high speed, the level of the reproduced signals gradually increases and the C/N ratio increase correspondingly (as indicated by a solid line in FIG. 5). The phenomenon is hereinunder referred to as "sensitization". Of course, the sensitization also depends upon the power level of the recording laser beam. Specifically, the time required for the sensitization phenomenon can be reduced by increasing the power level, but then signals cannot be accurately recorded since the final diameter of each recording pit becomes excessively large. If, in a recording material such as TeOx (0<x<2), the Te component is enriched, that is, if the value of x is reduced, the sensitization time can be reduced, but the weather resistance of the film deteriorates.

When optical recording and reproduction are effected by using a recording carrier having a Te-based amorphous recording film, the phenomomen of sensitization occurs when signals are reproduced. This is a significant problem in applications wherein it is necessary to read out signals at high speed immediately after they are recorded.

SUMMARY OF THE INVENTION

Accordingly, an object of the present invention is to provide an optical recording carrier wherein the phenomenon of sensitization can be reduced to shorten its sensitization time and improve its C/N characteristics, and in addition, its disc-like structure can be simplified and the weather resistance thereof can be improved.

Another object of the present invention is to provide a method of producing the optical recording carrier.

To these ends, the present invention provides an optical recording carrier comprising:

a single Te metal crystal layer having a thickness of 50 to 300 Å, and preferably 100 to 250 Å;

a substrate; and a layer made of an optical recording material containing Te or TeOx (0<x<2) as a main component and at least one selected from the group consisting of 0-20 at % Se, 0-15 at % C, 0-10 at % Sb, 0-5 at % Au, 0-5 at % Ag, 0-10 at % Pd, 0-5 at % As, 0-5 at % Ge, 0-5 at % S, 0-5 at % Si, and 0-3 at% Ni;

the single Te metal crystal layer being provided between the substrate and the layer made of the optical recording material.

The invention of this application further provides a method of producing the above-described optical recording carrier by using apparatus having the supply source of a single Te metal and another supply source of Te or any one of the above-described substances. In the apparatus, a single Te metal is supplied from the supply source thereof and a thin crystal layer of a single Te element is formed on the substrate by vapor deposition or sputtering. Subsequently, Te or any one of the abovedescribed substances is supplied from the supply source of Te or the above-described substances, and an optical recording layer containing Te or TeOx (0<x<2) as a main component and at least one selected from the above-described group consisting of Se, C, Sb and other components described above.

In accordance with the present invention, the additional deposition of a Te-crystal layer succeeded in reducing sensitization time to about 1/6, and it was possible to increase the C/N ratio about 1 db, without producing any effect on the weather resistance of the disc itself.

The above and other objects, features and advantages of the present invention will become apparent from the following description of the preferred embodiments thereof, taken in conjunction with the accompanying drawings.

DESCRIPTION OF THE PREFERRED EMBODIMENT

Figure 1:
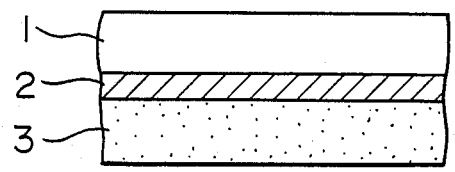
FIG. 1 is a cross-sectional view diagrammatically showing a preferred embodiment of the optical recording carrier in accordance with the present invention.

The present inventor fully considered and analized a method of forming a Te-based recording film and thus obtained the previously-described model of the phenomenon of sensitization. Based on this model, the inventor succeeded in obtaining a method of forcedly forming a crystallized single Te metal layer having a thickness of 50 to 300 Å between an optical recording layer and a substrate by vapor deposition or sputtering, prior to the formation of the optical recording layer.

The optical recording layer used in the present invention may contain a Te metal as a principal component and at least one selected from the group consisting of 0–20 at % Se, 0–15 at % C, 0–10 at % Sb, 0–5 at % Au, 0–5 at % Ag, 0–10 at % Pd, 0–5 at % As, 0–5 at % Ge, 0–5 at % S, 0–5 at % Si, and 0–3 at % Ni.

The present invention is unique in that crystal nuclei are forcedly provided onto a conventional pure amorphous film, although the pure amorphous film has been hitherto deemed to be optimal for the recording film.

Various methods have heretofore been known which seem to resemble the method of this invention, but are based on utterly different principles from that of this invention. According to a typical example of the prior-art methods, a thin Te amorphous layer is formed on a substrate in order to increase the sensitivity of the recording film, and another amorphous film for recording is then formed thereon.

The details of the present invention will be evident by referring to the difference between this invention and this prior arts.

First, a Te layer formed in order to increase the sensitivity of the recording film must be composed of an amorphous film in a case of prior art. However, since the additional Te layer of this invention is composed of a crystallized film, the structure of the invention does not increase the film sensitivity. Therefore, when the additional Te layer is composed of an amorphous film as in the case of prior art, the sensitivity rises as the thickness of this layer increases, but the crystallized film never contributes to recording mechanism based on the phase-change between the amorphous phase and the crystal phase. Hence, if the crystallized film thickness is increased, the sensitivity is inversely decreased. Also, if the additional Te layer is an amorphous-phase film, this layer cannot become nuclei for crystal growth, so that there is no reduction of the sensitization time.

It is also natural that the present invention greatly differs from the prior art in terms of the method of forming the single Te metal layer. In order to form a Te amorphous film, it is preferable that the formation time is as rapid as possible and the temperature of the substrate during the film formation is as low as possible, irrespectively of whether sputtering or vapor deposition may be adopted.

Unlike the prior art, according to the present invention, since a crystallized single Te metal film is to be formed, it is preferable for the rate of formation to be reduced and for a gas pressure used during vapor deposition and sputtering to be set at a level higher than the normal value, irrespectively of whether vapor deposition or sputtering may be adopted. Furthermore, the film thus formed is preferably aged in an $N_2$ gas at about 50° C. for several hours. This is because further crystallization needs to be progressed because the Te metal components within the film are not yet all crystallized even by the above-described method.

EXAMPLE

FIG. 1 is a diagrammatic cross-sectional view of the optical recording carrier of this invention, used as an aid in explaining the principle thereof.

In a case where a thickness of the single Te metal layer 2 is known, it is possible to immediately judge as to whether or not a crystallized single Te metal layer has been formed according to the method of this invention by measuring the reflectivity of the disc substrate 1. This is because the Te crystal layer of this invention exhibits reflectivity far higher than that of a Te amorphous layer. As an example, there was prepared a Te-based amorphous recording film 3 composed of a TeOx film (x=0.8) having a thickness of 1200 Å and the disc substrate 1 having a refractive index of about 1.5. If a single Te metal layer 2 were composed of an amorphous film having a thickness of about 180 Å, the reflectivity would be about 22%. If the single Te metal layer 2 was a crystal layer, the reflectivity would reach as high as 29%, thus resulting in a great difference in reflectivity between the amorphous film and the crystal film. (If the additional Te layer were absent, the reflectivity would range between 19 and 20%).

Figure 6A:
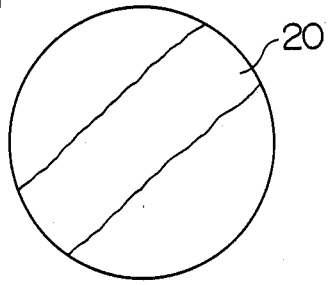
FIGS. 6a and 6a' are a diagramatical transmission electronography and an electron diffraction figure of a conventional recording carrier, respectively, while FIGS. 6b and 6b' are diagramatical transmission electronography and an electron diffraction figure of a recording carrier of the invention, respectively.
Figure 6A:
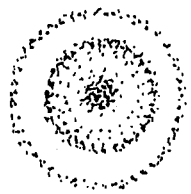

It will readily be understood from the foregoing description that the present invention is essentially different from the prior art. Furthermore, there is a critical difference in the photographic figures obtained from a transmission electron microscope and in electron diffraction figure between the invention and the prior art. FIGS. 6a and 6a' illustrate a case where the additional Te layer is an amorphous layer, while FIGS. 6b and 6b' illustrate another case where the additional Te layer is a crystal layer. As will be evident from these diffraction figures, judgement can be easily made as to whether or not a given additional Te layer was one intended in the present invention.

Figure 6B:
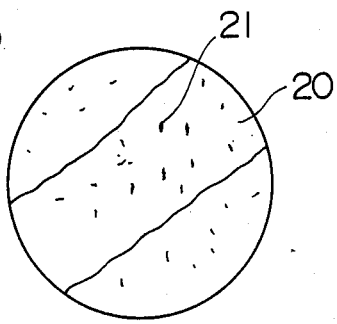
Figure 6B:

With reference to FIGS. 6b and 6b', the effect of this invention will be described in more detail below.

As can be seen from the transmission electronography and electron diffraction figure in FIGS. 6b and 6b', when the single Te metal layer 2 is about 200 Å in thickness, the layer 2 has not yet grown into a uniformly continuous metal film. In this state, the layer 2 can act as remarkably effective crystal seeds 21 thereby reducing sensitization time. However, when the thickness of the single Te metal layer 2 is equal to or greater than 300 Å, the layer 2 becomes a continuous metal film, with the result that it is difficult for the layer 2 to act as crystal nuclei and at the same time crystal grains are formed, thereby rapidly lowering the C/N ratio of the recording an reproduced signals. On the other hand, when the thickness of the single Te metal layer 2 is not greater than 50 Å, it is difficult to form effective crystal nuclei, and also, the number of pieces of the nuclei is small, so that sensitization time cannot be sufficiently reduced. The reference numerical 20 indicates a recording track.

Figure 5:
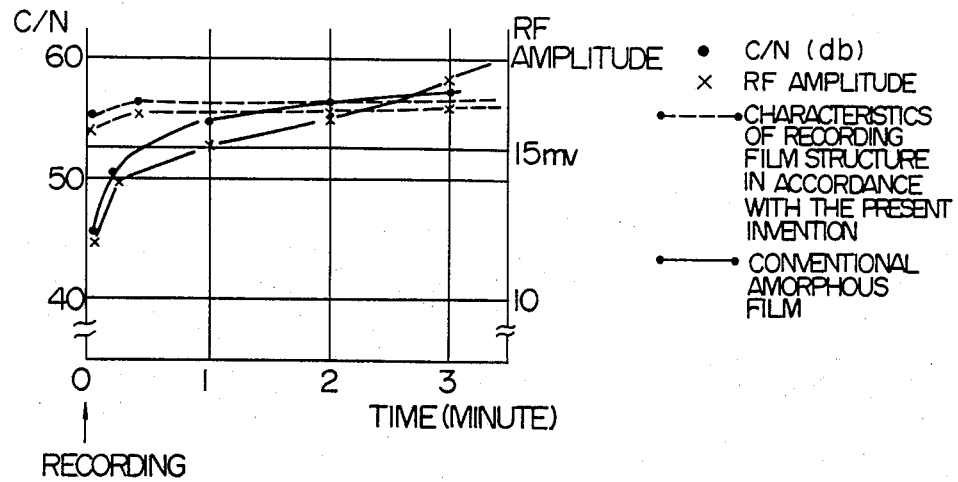
FIG. 5 is a graph of the recording and reproducing characteristics of embodiments of the optical recording carrier of the invention.

Referring to FIG. 5, curves represented by dotted lines show the sensitization characteristics obtained when using the method of this invention. As can be seen from the graph in FIG. 5, sensitization time can be reduced to a period of time equivalent to 20/120, or 1/6, by cladding a single Te metal crystal layer between an amorphous recording film and a substrate, that is, the prior art film reaches 55 dB, which is the minimum practical level concerning the C/N, by the elapse of 2 minute (120 sec) while the recording film of the invention reaches 55 dB by 20 sec, so that the sensitization time in the invention becomes 1/6 in comparison with the prior art.

Figure 2:
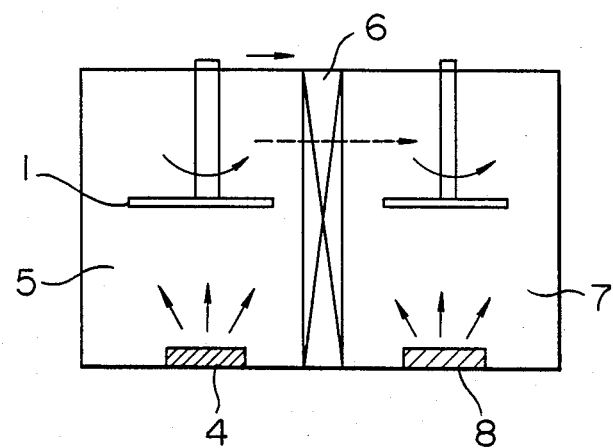
FIG. 2 is a diagrammatic cross-sectional view of an exemplary apparatus for practicing a method of producing the optical recording carrier of this invention.
Figure 3:
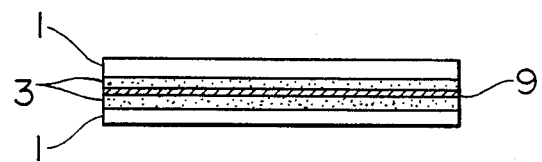
FIG. 3 is a cross-sectional view diagrammatically showing a prior-art optical recording carrier of a clad type.
Figure 4A:
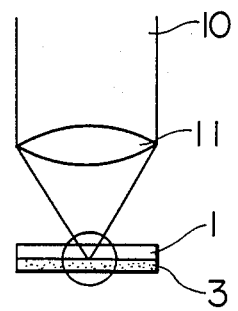
FIGS. 4(a) and 4(b) are respectively a diagrammatic sectional view and a diagrammatic plan view used as aids in explaining the phenomenon of sensitization.
Figure 4B:
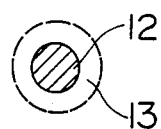

A description will be made below of a method of producing a recording carrier including the structure of this invention by using a sputtering apparatus with specific reference to FIG. 2.

As shown, the disc substrate 1 was placed within a first chamber 5, which substrate is usually rotated about its axis for the purpose of obtaining uniform film thickness. Then, a target 4 made of a single Te metal was placed in the interior of the first chamber 5. The first chamber 5 was filled with a sputtering gas of Ar, and the pressure therein was preferably set to about $3 \times 10^{-3}$ Torrs. The target 4 was supplied with an electric power of approximately 30 W from a D.C. power supply (not shown). Such an electric power enabled a crystal layer made of a single Te metal of 180 Å in thickness to be formed on the surface of the disc substrate 1 for about 20 seconds per piece. In this manner, the single Te metal layer was crystallized by effecting such a low-power sputtering for a relatively long period of time. After the single Te metal crystal layer was formed within the first chamber 5, a shutter 6 was opened and the disc substrate 1 was moved into a second chamber 7 in which an oxygen gas having a gas pressure of $7 \times 10^{-4}$ Torrs was added to an Ar gas having a gas pressure of $3 \times 10^{-3}$ Torrs. A target 8 made of a single Te metal was placed within the second chamber 7, and a D.C. power of 120 W was applied to the target 8 from a D.C. power supply (not shown). Within the second chamber 7, such an electric power enabled the recording material 3 shown in FIG. 1 to be formed on the single Te metal crystal layer for about fifty seconds per one piece, with the recording material 3 being composed of a TeOx amorphous layer of about 1200 Å in thickness. Measurement was made regarding the sensitization characteristics of the thus-obtained recording carrier. The resultant electrical characteristics are indicated by the dotted lines shown in FIG. 5.

Another 80% Te- 5% Sb- 15% Se alloy target was placed as the target 8 within the same apparatus as that of the above-described embodiment. Within the first chamber 5, the Te metal crystal layer 2 of about 180 Å in thickness was formed in the same conditions as those of the above-mentioned example. Within the second chamber 7, sputtering was effected by using only an Ar gas, thereby forming a recording material made of the 80% Te- 5% Sb- 15% Se amorphous film of about 1000 Å in thickness. Measurement was made of the sensitization characteristics of the thus-formed recording carrier. The resultant electric characteristics were identical with ones shown by the dotted lines in FIG. 5.

When the optical recording carrier of this invention is produced by vapor deposition, a single Te metal was first evaporated from an evaporation source of a single Te metal, and a single Te metal crystal layer having a thickness of about 50 to 300 Å was formed on the surface of the substrate. Then, in an atmosphere containing an oxygen gas, substances containing Te were evaporated from one vaporation source of a single Te metal, and an optical recording layer containing an amorphous TeOx ($0<x<2$) was formed on the surface of the single Te metal crystal layer by vapor deposition.

Alternatively, after the single Te metal has been evaporated from the evaporation source of a single Te metal, a single Te metal crystal layer having a thickness of about 50 to 300 Å was formed on the surface of the substrate by vapor deposition. Subsequently, metal containing Te and at least one selected from the group consisting of 0-20 at % Se, 0-15 at % C, 0-10 at % Sb, 0-5 at % Au, 0-5 at % Ag, 0-10 at % Pd, 0-5 at % As, 0-5 at % Ge, 0-5 at % S, 0-5 at % Si and 0-3 at % Ni was evaporated from the evaporation source including Te so that an amorphous optical recording layer containing Te or TeOx as a principal component and at least one selected from the group consisting of 0-20 at % Se, 0-15 at % C, 0-10 at % Sb, 0-5 at % Au, 0-5 at % Ag, 0-10 at % Pd, 0-5 at % As, 0-5 at % Ge, 0-5 at % S, 0-5 at % Si, and 0-3 at % Ni may be formed by vapor deposition on the surface of the above-described single Te metal crystal layer.

Moreover, when the optical recording carrier of this invention is produced by sputtering, a single Te metal was first supplied from a sputtering target composed of a single Te metal so that a single Te element crystal layer having a thickness of about 50 to 300 Å may be formed on the surface of the substrate by sputtering. Then, in an atmosphere containing an oxygen gas, substances containing Te was supplied from the sputtering gate including Te, and an optical recording layer containing an amorphous TeOx ($0<x<2$) was formed on the surface of the above-described single Te metal crystal layer by sputtering.

Alternatively, after a single Te metal has first been supplied from the sputtering target composed of a single Te metal, a single Te element crystal layer having a thickness of 50 to 300 Å was formed on the surface of the substrate by sputtering. Then, substances containing Te were supplied from a sputtering target including Te as a main component, an amorphous optical recording layer containing Te or TeOx ($0<x<2$) as a main component and at least one selected from the group consisting of 0-20 at % Se, 0-15 at % C, 0-10 at % Sb, 0-5 at % Au, 0-5 at % Ag, 0-10 at % Pd, 0-5 at % As, 0-5 at % Ge, 0-5 at % S, 0-5 at % Si, and 0-3 at % Ni was formed on the surface of the above-described metal crystal layer by sputtering.

What is claimed is:

1. An optical recording carrier comprising:
   a substrate;
   a layer of an amorphous phase made of an optical recording material containing one of Te and TeO$_x$ ($0\times2$) as a main component, said amorphous phase being changed to a crystalline phase by the irradiation of a laser beam or the like on said amorphous phase layer, thereby recording information on the optical recording material, and
   a Te metal layer of a crystalline phase having a thickness of 50 to 300 Å, said Te metal layer being provided between the substrate and the optical recording material layer and being in direct contact with the optical recording material layer such that said Te metal crystalline layer accelerates the phase change of the optical recording material from said amorphous phase to said crystalline phase to facilitate said recording of information on the optical recording material.

2. An optical recording carrier according to claim 1, wherein said layer of said optical recording material contains Te or TeOx ($0<x<2$) as a main component and at least one selected from the group consisting of 0-20 at % Se, 0-15 at % C, 0-10 at % Sb, 0-5 at % Au, 0-5 at % Ag, 0-10 at % Pd, 0-5 at % As, 0-5 at % Ge, 0-5 at % S, 0-5 at % Si, and 0-3 at % Ni.

3. An optical recording carrier according to claim 1, wherein said layer of said optical recording material is formed of an amorphous substance containing Te or TeO$_x$ ($0<x<2$) as a main component and at least one selected from the group consisting of 0-20 at % Se, 0-15 at % C, 0-10 at % Sb, 0-5 at % Au, 0-5 at % Ag, 0-10 at % Pd, 0-5 at % As, 0-5 at % Ge, 0-5 at % S, 0-5 at % Si, and 0-3 at % Ni, said recording material layer being changed from the amorphous phase to the crystal phase by the irradiation of a laser beam of the like on said layer so that information is recorded thereon.

4. The optical recording carrier as in claim 1, wherein said optical recording material contains Te as a main component.

5. The optical recording carrier as in claim 1, wherein said optical recording material contains TeOx ($0<x<2$) as a main component.

* * * * *